(12) United States Patent
Sevanto et al.

(10) Patent No.: US 6,987,779 B1
(45) Date of Patent: Jan. 17, 2006

(54) METHOD AND ARRANGEMENT FOR INDICATING SERVICE SPECIFICITY FOR PDP CONTEXTS

(75) Inventors: Jarkko Sevanto, Helsinki (FI); Mohan L. Sivanandan, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 563 days.

(21) Appl. No.: 09/593,904

(22) Filed: Jun. 14, 2000

(30) Foreign Application Priority Data

Jun. 14, 1999 (FI) ..................................... 991364
Jun. 15, 1999 (FI) ..................................... 991373

(51) Int. Cl.
*H04J 3/16* (2006.01)
*H04J 3/24* (2006.01)
(52) U.S. Cl. ..................................... 370/469; 370/349
(58) Field of Classification Search ................ 370/338, 370/401, 349, 392, 389, 386, 469, 474; 379/88.22; 709/227; 445/433, 406, 426.1
See application file for complete search history.

(56) References Cited

U.S. PATENT DOCUMENTS 6,104,929 A * 8/2000 Josse et al. ................. 455/445
6,496,690 B1 * 12/2002 Cobo et al. ................. 455/408

FOREIGN PATENT DOCUMENTS

DE 19535378 3/1997
WO WO 99/16266 4/1999
WO WO 00/16579 3/2000

* cited by examiner

*Primary Examiner*—Duc Ho
(74) *Attorney, Agent, or Firm*—Perman & Green, LLP.

(57) ABSTRACT

A method and an arrangement are provided for indicating the specific use of a packet-switched communication connection between a mobile station and a fixed packet-switched data transmission network. The activation of a new packet-switched communication connection involves the step of transmitting an activation request message with a service type indicator field for which a set of service type indicator values have been defined. An additional step is performed for transmitting within the activation request message an indicator value indicating the specific use, in more detail than the service type indicator values, of the packet-switched communication connection the activation of which is requested with the activation request message.

15 Claims, 4 Drawing Sheets

METHOD AND ARRANGEMENT FOR INDICATING SERVICE SPECIFICITY FOR PDP CONTEXTS

TECHNOLOGICAL FIELD

The invention concerns the technological field of managing the PDP Contexts and similar communication connections based on packet-switched bearer services between a mobile station and a fixed packet-switched network. Especially the invention concerns the task of indicating the specific use of PDP Contexts having the same PDP Type for e.g. charging purposes.

BACKGROUND OF THE INVENTION

FIG. 1 illustrates some system aspects of a known proposal for arranging the communication connections between a mobile station 101 or 102 and a fixed packet-switched network. In FIG. 1 each mobile station or MS (or User Equipment or UE as in the UMTS specifications) is operating in a cellular telephone system of its own: UE 101 is a UMTS terminal operating in a UMTS network 103 and MS 102 is an enhanced GSM terminal operating in an enhanced GSM network 104. From both networks there is a connection to a GPRS network 105. The UMTS network 103 comprises a UTRAN or UMTS Terrestrial Radio Access Network 106 as well as a CN or Core Network 107. In the enhanced GSM network 104 a BSS or Base Station Subsystem 108 and an MSC or a Mobile Switching Centre 109 are shown. The detailed structure of the network elements is unessential to the present invention, but it is known that for example a UTRAN consists of a number of Radio Network Subsystems, each of which in turn comprises a Radio Network Controller and a number of Node Bs roughly corresponding to base stations. A BSS in turn comprises a Base Station Controller and a number of Base Transceiver Stations operating under it. Various mixed-mode cellular telephone systems are possible; for example the BSS 108 might operate under the same CN as the UTRAN 106. The mobile stations shown in FIG. 1 could also be exactly similar terminals operating close to each other in a single cell.

In FIG. 1 there is a connection both from the UTRAN 106 and from the BSS 108 to a corresponding SGSN or Serving GPRS Support Node 110 and 111. It is known to have a certain Packet Control Unit or PCU in the Base Station Subsystem and/or the UTRAN to act as a gateway to and from the SGSN. Both SGSNs 110 and 111 are in turn coupled, through the GPRS trunk lines, to a GGSN or Gateway GPRS Support Node 112 which may also have other functions: in FIG. 1 it is shown to operate as an MMSC or a Multimedia Messaging Service Center for the sake of example. The MSs may be coupled to different GGSN or they may be coupled to the same GGSN through the same SGSN; various communication configurations are available as is well known by the person skilled in the art.

Setting up an active communication connection between a terminal and the fixed packet-switched network, i.e. using a mobile station to access the packet data services offered through the fixed packet-switched network, means that a so-called PDP Context has to be activated between the mobile station and a GGSN. Activating PDP Contexts is known as such and proceeds through a known and documented exchange of messages between the mobile station and the GGSN. Specifically, the mobile station transmits an Activate PDP Context Request message in a way basically known as such. The BSS or UTRAN recognizes the Activate PDP Context Request message as concerning packet-switched services and consequently routes it to the current SGSN in a known way, e.g. through a PCU. After the SGSN has received the request a set of security functions may be executed between the mobile station and the SGSN. The SGSN validates the activation request and selects a GGSN based on the HLR (Home Location Register) records associated with the mobile station and/or an MS-provided APN (Access Point Name) string. The SGSN transmits to the selected GGSN a Create PDP Context Request message.

When the GGSN receives the message it checks, among others, the context type that the mobile station has requested. Known PDP types at the priority date of this patent application are IP for using Internet Protocol based services, X.25 for using X.25-protocol based services and OSP (Octet Stream Protocol) for using unstructured octet streams as the carrier for some otherwise unspecified services. The GGSN may select an external network element as the actual provider of the requested service, based on the APN and/or the PDP Configuration Options field in the context activation request. For some services also integrated with service provider the GGSN may act as the service provider. The GGSN creates an association with the service attributes and the established "tunnel" or PDP Context between it and the mobile station.

After the service has been activated and possibly some service-related parameters have been configured (e.g. according to the information delivered in the Protocol Configuration Options information element included in the activation request message in a known manner), the GGSN sends a Create PDP Context Response message to the SGSN, which receives it and transmits a corresponding Activate PDP Context Accept message to the MS. The reception of this message at the MS finalizes the context activation. After that, there is a logical tunnel in place between the MS and the GGSN.

The activation of the PDP Context may also take place upon the initiative of a service provider or other fixed network element. Such a procedure begins by a GGSN receiving a PDU or Protocol Data Unit which is noted to require the activation of a PDP Context. The GGSN may request a HLR or Home Location Register to provide valid routeing information for the mobile station concerned, which request the HLR answers with an acknowledging message containing the requested information, specifically the identifier (address) of the currently valid SGSN. The GGSN uses the received address to send a PDU Notification Request message to the SGSN, which answers with a PDU Notification Response message in order to acknowledge that it shall request the mobile station to activate the PDP Context indicated with a PDP Address received within the PDU Notification Request message. Thereafter the SGSN transmits a Request PDP Context Activation order to the mobile station through the appropriate radio access network. The mobile station should obey the order by commencing the procedure explained above as the mobile-originated PDP Context activation.

It is known that a mobile station may have several PDP Contexts active at any moment. There are no limitations to the Type attributes of these contexts, so there may even be several simultaneous active PDP Contexts of the same type.

The SGSNs and GGSNs collect charging information for each PDP Context separately. The problem of the known methods and arrangements for managing PDP Contexts is that there are no effective ways of associating a certain PDP Context with certain service or detailed service type in order for the network operator to arrange the charging according to actual usage of services.

There are naturally the known PDP Context Type attribute separately associated with each active PDP Context, as well as the QoS or Quality of Service profile which consists of certain service attributes and which could be indirectly used to indicate the service type. However, the known value space for PDP Context Type attributes is very limited and it is not feasible to extend it to cover a broad selection of possibly dynamically changing service alternatives. Using a QoS profile to characterize a service type is not reliable since there are no guarantees that such a "QoS profile->service type" mapping would be unambiguous: several different services or service types may require exactly same QoS profiled despite of them being clearly different from the charging point of view. The solution of using PDP addresses for identifying services is not feasible, because e.g. IP-based services are often associated with dynamically allocated IP addresses: it would be very difficult to maintain an up-to-date mapping table between dynamically allocated IP addresses and certain services. Static IP addresses are also not feasible due to the limited IP address space. In addition, some mobile stations may not be able to handle several IP-addresses simultaneously.

SUMMARY OF THE INVENTION

It is an object of the present invention to provide a method and an arrangement for unambiguously indicating the specific use of a certain PDP Context or similar communication connection based on packet-switched bearer services between a mobile station and a fixed packet-switched network. It is an additional object of the invention that it does not require extensive reformulation of the standards existing at the priority date of this patent application, especially concerning the standards of GPRS and UMTS. A further object of the invention is to enable service specific charging schemes where network elements collect information about the actual services used so that a postprocessing and billing unit may identify the services in more detail than just known PDP Types.

The objects of the invention are achieved by transmitting the indication of specific use within one of the context activation messages, preferably as a subvalue associated with an existing PDP Context Type value or as one of the PDP Configuration Options.

The method according to the invention is characterized in that it comprises the step of transmitting within an activation request message an indicator value indicating the specific use, in more detail than a set of predefined service type indicator values, of the packet-switched communication connection the activation of which is requested with the activation request message.

The invention also applies to an arrangement with the characteristic means for transmitting, within an activation request message, an indicator value indicating the specific use, in more detail than a set of predefined service type indicator values, of the packet-switched communication connection the activation of which is requested with the activation request message.

The invention is based on the insight that there has already been specified certain mechanisms for exchanging information between the devices that are to take part in a PDP Context that is activated. By using these mechanisms and making novel and inventive additions thereto it is even rather simple to unambiguously indicate a specific use for each active PDP Context.

Especially there has already been defined the indication of PDP Context Type in the Activate PDP Context Request message transmitted by the mobile station. Instead of defining completely new values we suggest that the existing values are allowed to have optional extensions that identify the specific use of the service. For example the known IP type for PDP Contexts may be defined to comprise subtypes like IP:MMS for Multimedia Messaging Services, IP:WAP for Wireless Application Protocol based services and so on. It is advantageous to define the indication of the subtypes so that an older or simpler network element that is only capable of recognizing the basic types (IP, X.25, OSP) may simply ignore the extension that defines the subtype.

The use of subtypes that are defined to fall within the categories defined by the existing types a remarkable burden of standard reformulation is avoided, because the handling of the known types may be left as it is. It is straightforward to apply the instructions given in this patent application to amend the programs that form an embedded part of the network elements and control the operation thereof so that in addition of recognizing the "main" type and handling the PDP Context accordingly in a known fashion they also read the subtype and store it for example as a part of the charging information.

An alternative way of indicating the specific use of a certain PDP Context is to define a corresponding configuration parameter that is transmitted within the appropriate field of the Activate PDP Context Request message together with known configuration parameters. This approach may cause the Activate PDP Context Request message to be longer that the most preferable "subtype" alternative described above, since the addition of a new configuration parameter may require more side information like parameter count, parameter length, parameter ID and so on to be added into the message.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been discussed above in the description of prior art, so in the following we will mainly concetrate on FIGS. 2a to 4.

DETAILED DESCRIPTION OF THE INVENTION

Figure 2A:
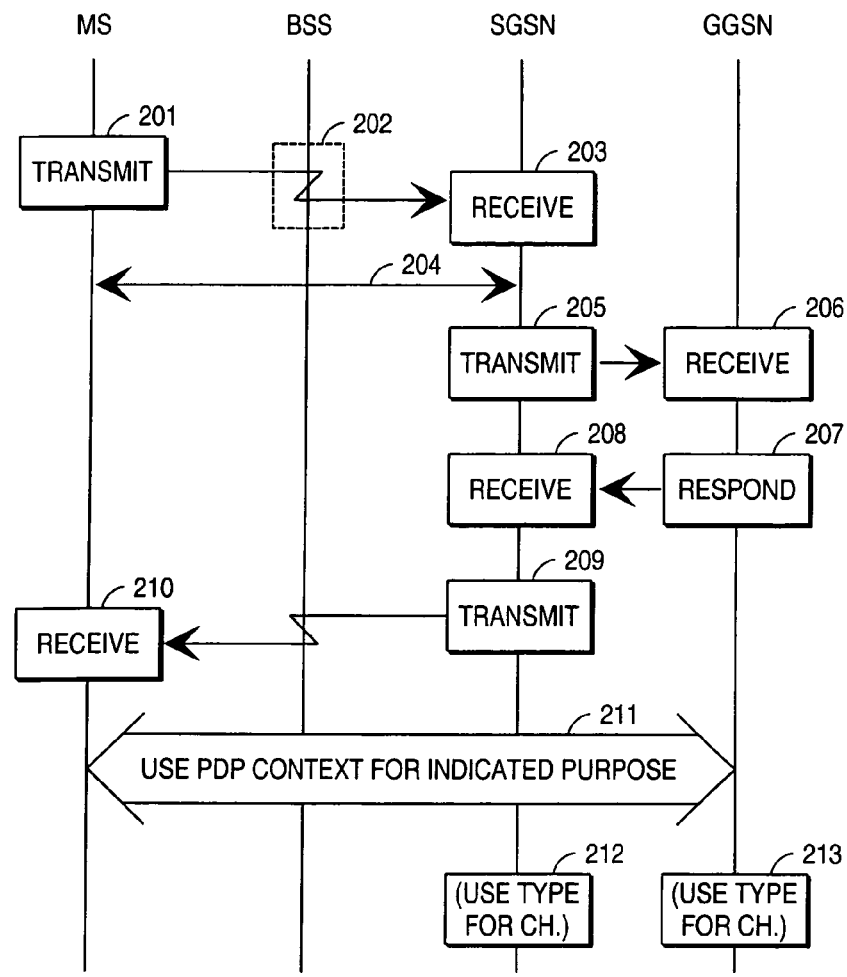
FIG. 2a illustrates an exchange of messages according to an advantageous embodiment of the invention.

FIG. 2a illustrates an exemplary exchange of messages between a MS, an SGSN and a GGSN through a BSS. At step 201 the MS transmits an Activate PDP Context Request message which is illustrated in more detail in FIG. 3a and preferably contains at least the following information:

The Network Service Access Point Identifier or NSAPI 301 is selected by the MS. NSAPI identifies the PDP context to be activated within the GPRS/UMTS network. For identifying the user the message comprises also the TLLI (Temporary Logical Link Identity) and IMSI (International Mobile Subscriber Identity) information elements (not shown in FIG. 3a).

The PDP Type 302 shall have a two-part value. The first part 302a is a main value that shall identify the protocol; typical main values are the predefined identifiers of the IP, X.25 and OSP protocols. The second part 302b shall identify the service being used according to the most preferable embodiment of the invention. The second part may be used as a guide to the charging scheme to be applied for the service. The SGSN may also use it for selecting a proper GGSN (for example a one with MMSC capabilities, if the service in question is MMS) that can provide the service. The two-part value of the PDP Type field can be expressed e.g. as XX:YYY, where XX is the main value and YYY is the extension according to this embodiment of the invention.

The PDP Address field 303 is most advantageously empty. Entering an address in this field means that the MS requires the use of a static PDP address, and leaving the field empty means that the MS requests a dynamic PDP address.

The Access Point Name or APN 304 is selected by the MS. An APN is a logical name referring to the external packet data network that the subscriber wishes to connect to. The selected APN identifies the GGSN and possible other service provider which the MS wants to use for this context. The actual APN to be used (i.e. GGSN and possible additional service provider to be used) can be restricted by the operator by subscription. If that is the case, the HLR (Home Location Register) record of each user includes the APN information identifying the GGSNs and service providers that should always be used; they may naturally be different for different services or service classes. The MS may omit the APN from the Activate PDP Context Request message if the APN is configured in the HLR. Otherwise the user may include an APN in the message. If there is no APN in the message and no APN is configured in the HLR, the SGSN is free to choose any GGSN and other service provider to be used (if Dynamic Allocation in the visited network is allowed by the HLR record).

The QoS Requested 305 (where QoS comes from Quality of Service) is selected by the MS. The requested service quality comprises a number of factors and their selection typically depends on the desired characteristics of the service. Among the subjects to be considered are the eventual need for RLC&LLC retransmissions, the use of UDP (User Datagram Protocol) at the GPRS backbone network, bit rates, delay class and service precedence.

The PDP Configuration Options field 306 can be used e.g. for informing the GGSN and/or service provider about certain capabilities of the MS, such as supported content-types etc. General configuration information can be included in this information element if these are not implemented into the applied protocol itself. If there are many choices for the applied protocol (either totally separate protocols or different versions of the same protocol), the PDP Configuration options can be used for informing the GGSN and/or the service provider which protocol(s) the MS supports. An alternative embodiment of the invention is to provide the specific service type identifier as a part of this field instead of using the two-part value for the PDP Type field 302. Such provision of specific service type identifier could mean for example the addition of "Service=YYY" into the PDP Configuration Options field 306, where YYY is again an identifier of a specific service.

Figure 1:
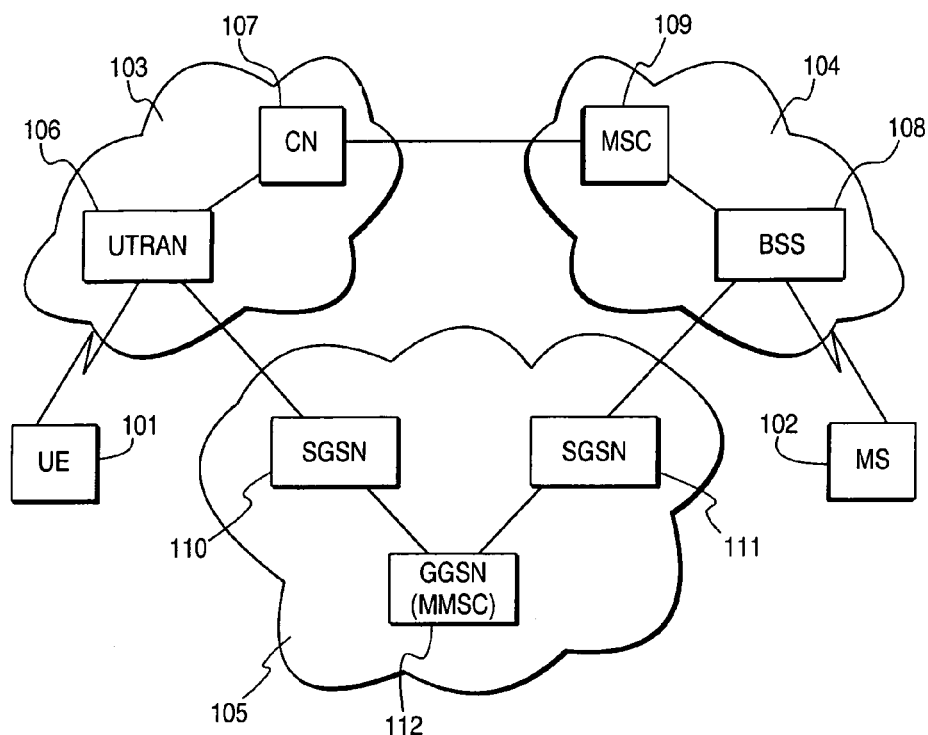
FIG. 1 illustrates a known network arrangement.
Figure 3C:
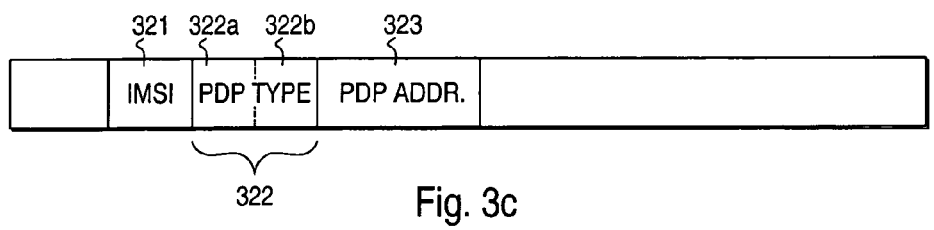
FIG. 3c illustrates a notification message according to the invention.
Figure 3D:
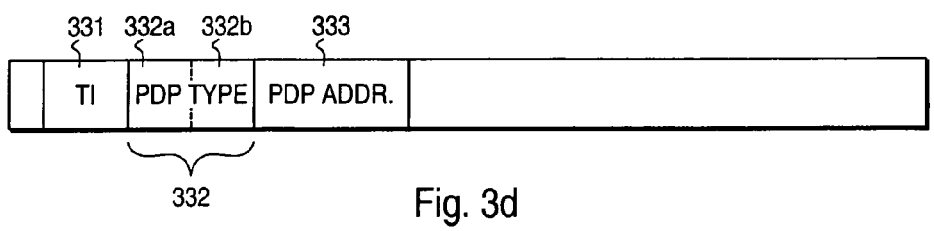
FIG. 3d illustrates an activation order message according to the invention.
Figure 3A:
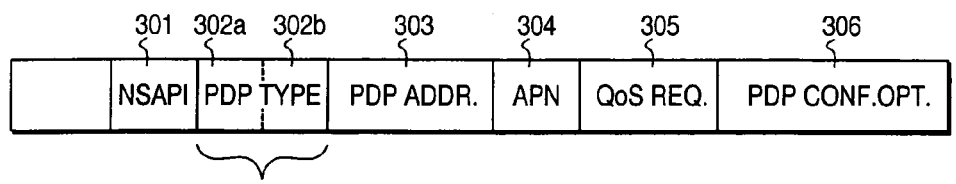
FIG. 3a illustrates an activation request message according to the invention.
Figure 3B:
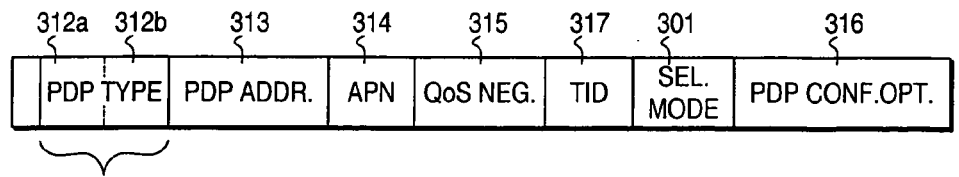
FIG. 3b illustrates a creation request message according to the invention.

At step 202 the BSS recognizes the Activate PDP Context Request message as concerning packet-switched services and consequently routes it to the current SGSN in a known way. At step 203 the SGSN received the Activate PDP Context Request message. Step 204 refers to the optional execution of known security functions between the MS and the SGSN. At step 205 the SGSN selects the GGSN based on the HLR records and/or the MS-provided APN string in a known way and transmits a Create PDP Context Request message. An exemplary advantageous form of this message is shown in FIG. 3b with the following fields:

The PDP Type 312 is a copy of field 302 in the Activate PDP Context Request message, so according to the preferable embodiment it shall have a two-part value: a main value 312a that shall identify the protocol and a second part 312b that shall identify the service being used. The two-part value of the PDP Type field can again be expressed e.g. as XX:YYY, where XX is the main value and YYY is the extension according to this embodiment of the invention.

The PDP Address field 313 is most advantageously empty meaning that a dynamic PDP address is requested.

The Access Point Name or APN field 314 contains an APN Network Identifier of the APN selected by the SGSN according to the known procedures of GPRS.

The QoS Negotiated field 315 indicates the result of a QoS negotiation between the MS and the SGSN. It is not downwards binding to the GGSN, meaning that the GGSN is allowed to further restrict the QoS given its capabilities and the current load.

The TID or Temporary identifier 317 is composed by the SGSN for the requested PDP Context by combining the IMSI (International Mobile Subscriber Identifier) stored in the MM context (Mobility Management contex) of the MS and the NSAPI received in field 301 of the Activate PDP Context Request message.

The Selection Mode field 318 indicates whether a subscribed APN was selected, or whether a non-subscribed APN sent by the MS or a non-subscribed APN chosen by the SGSN was selected. The GGSN may use the contents of this field in deciding whether to accept or reject the PDP Context activation.

The PDP Configuration Options field 316 is an exact copy of field 306 in the Activate PDP Context Request message, i.e. the configuration options are transmitted transparently through the SGSN. According to the alternative embodiment of the invention a part of this field comprises the service type identifier for example in the form "Service=YYY", where YYY is an identifier of a specific service.

At step 206 the GGSN receives the message and recognizes from the indicator according to the invention which specific service type is involved. The GGSN decides to provide the service by itself or to select an external service provider based on the APN and/or the PDP Configuration Options field in the context activation request. The GGSN creates an association with the service attributes and the established tunnel (identified by TID consisting of the user's IMSI and the NSAPI value of the PDP context).

After the service has been activated and possibly some service-related parameters have been configured (e.g. according to the information delivered in the Protocol Configuration Options information element), the GGSN sends at step 207 a Create PDP Context Response message to the SGSN, which receives it at step 208. The structure and contents of the message may be the same as in prior art Create PDP Context Response messages: the object of letting both the SGSN and the GGSN know the specific service type identifier has been accomplished through the use of the Activate PDP Context Request and Create PDP Context Request messages explained above. At step 209 the SGSN transmits an Activate PDP Context Accept message to the MS. The reception 210 of this message at the MS finalizes the context activation. No PDP address need to be assigned for the context, although such an assignment is not precluded by the invention. After step 210, there is a logical tunnel in place between the MS and the GGSN, where use of the specific service using the activated PDP context may be made as illustrated by block 211.

The identifier of the specific service type is stored at least in the GGSN and the SGSN. These devices may use it for example for charging purposes which is schematically illustrated by blocs 212 and 213. This means that when the SGSN and GGSN are storing charging information (duration of connection, starting and ending times, peer identifier etc.), in a way otherwise known as such, they also store the identifier of the specific service type separately for each PDP Context. After that it easy to make a computer run through the stored records and charge the subscriber responsible for the terminal for all used services according to a predefined charging schedule.

Figure 2B:
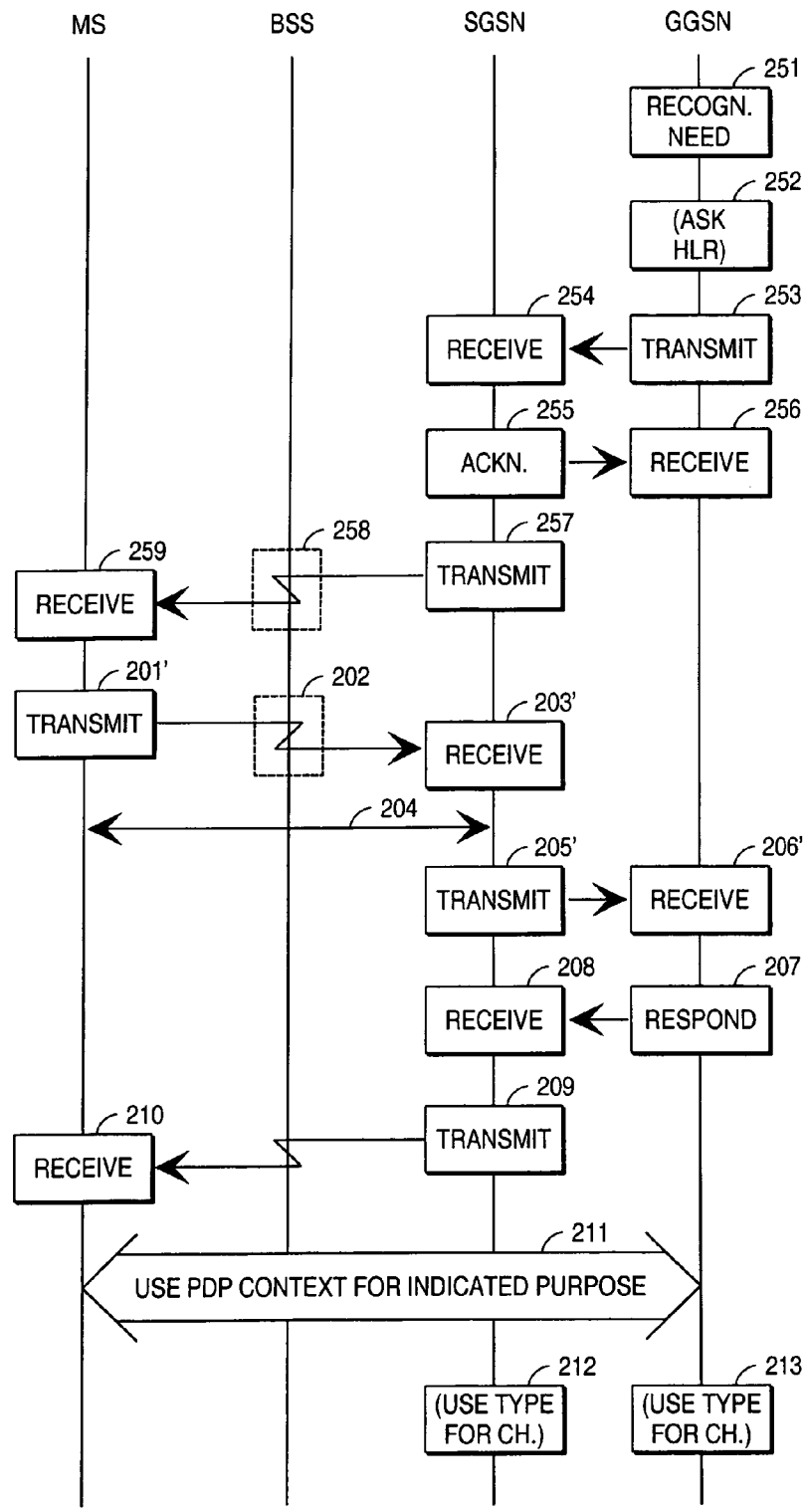
FIG. 2b illustrates an exchange of messages according to another advantageous embodiment of the invention.

FIG. 2b illustrates a network-requested PDP Context activation procedure according to an advantageous embodiment of the invention. At step 251 the GGSN becomes aware of the need for activating a new PDP Context with a certain MS. At step 252 it may ask the HLR (not shown) of that MS for the currently valid routeing information to the MS. At step 253 the GGSN utilizes the currently valid routeing information by transmitting to the currently valid SGSN a PDU Notification Request message which is schematically shown in FIG. 3c and advantageously comprises at least the following fields:

The IMSI 321 is the International Mobile Subscriber Identifier of the mobile station with which the PDP Context should be activated.

The PDP Type 322 shall again have a two-part value according to the preferable embodiment of the invention. The first part 322a is a main value that shall identify the protocol; typical main values are the predefined identifiers of the IP, X.25 and OSP protocols. The second part 322b shall identify the service being used according to the most preferable embodiment of the invention. The two-part value of the PDP Type field can be expressed e.g. as XX:YYY, where XX is the main value and YYY is the extension according to this embodiment of the invention.

The PDP Address field 323 comprises a dynamic or static PDP address to be used for the PDP Context to be activated.

After having received the PDU Notification Request at step 254 the SGSN transmits a simple acknowledgement message with a "cause" parameter back to the GGSN in a known way at step 255; the reception of the acknowledgement at the GGSN is shown as step 256. At step 257 the SGSN transmits a Request PDP Context Activation order towards the mobile station. An exemplary order message is schematically shown in FIG. 3d and it comprises the following fields:

The TI or Temporary Identifier field 331 contains the temporary identifier by which the MS is known within its current BSS or radio access network.

The PDP Type field 332 is a copy of field 322 in the PDU Notification Request message, so according to the preferable embodiment it shall have a two-part value: a main value 332a that shall identify the protocol and a second part 332b that shall identify the service being used. The two-part value of the PDP Type field can again be expressed e.g. as XX:YYY, where XX is the main value and YYY is the extension according to this embodiment of the invention.

The PDP Address field 333 comprises a dynamic or static PDP address to be used for the PDP Context to be activated. The field is a copy of field 323 in the PDU Notification Request message.

Step 258 represents the known routing of the Request PDP Context Activation order through the BSS to the MS, and step 259 represents the reception of the message by the MS. Thereafter follows a PDP Context Activation procedure which is otherwise the same as explained above in association with FIG. 2a but in the uplink direction messages where a PDP Type field appears there will be the PDP Type which the MS has learned from the Request PDP Context Activation order instead of any PDP type indicator freely choosable to the MS. Similarly the uplink messages comprising a PDP Address field comprise the PDP address previously transmitted in the downlink direction. The affected messages and states are marked with a primed reference designator.

Actually it would not be essential at all to copy the specific service type indicator at all to the uplink messages that are a part of the network-requested PDP Context activation procedure, because the SGSN and the GGSN already know the specific service type indicator. However, it is advantageous to put it in so that the mobile-initiated and network-initiated procedures have as much in common as possible.

Figure 4:
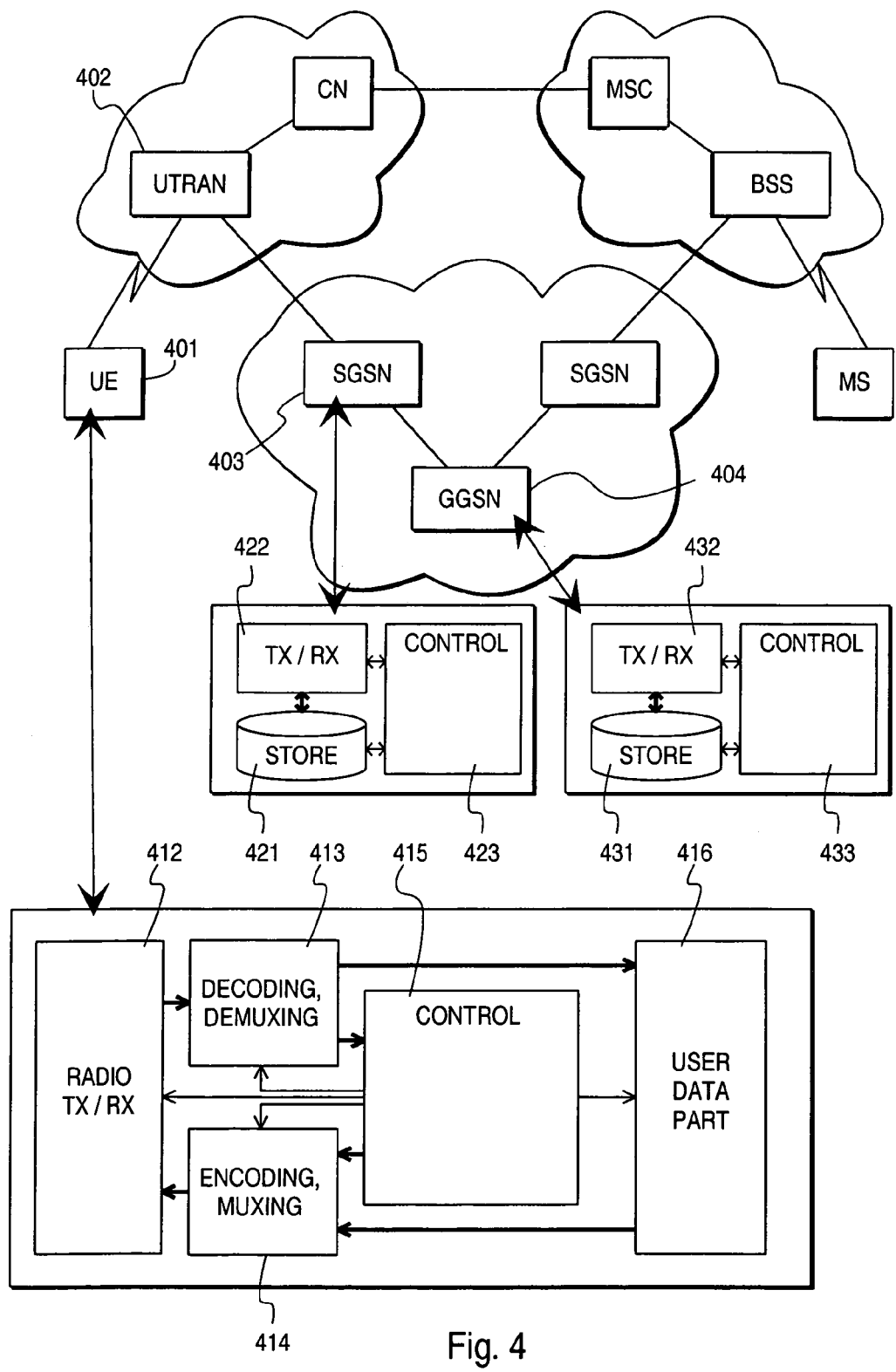
FIG. 4 illustrates an arrangement according to the invention.

FIG. 4 illustrates an arrangement according to the invention comprising a terminal or MS (or UE) 401, a BSS or UTRAN 402, a SGSN 403 and a GGSN 404. The hardware of the terminal comprises a radio transceiver block 412, a decoding/demultiplexing block 413, an encoding/multiplexing block 414, a control block 415 and a user data part 416. The decoding/demultiplexing block 413 is arranged to separate received signalling information from received user data and to direct the former into the control block 415; similarly the encoding/multiplexing block 414 is arranged to take signalling information from the control block 415 and to multiplex it for transmission with user data coming from the user data part 416. All other blocks operate under the supervision of the control block. The control connections are shown with thinner lines than the user data and signalling information connections. The present invention is implemeted in the terminal so that the control block 415 is instructed to add the specific service type identifer to all Activate PDP Context Request messages it will compose; this is done by programming the corresponding operations into a memory in the form of machine-readable processing instructions. If the terminal arrangement comprises a number of separate functional entities, the control block may be understood to consist of the control functions distributed into the physical controlling entities of the separate devices.

The SGSN is basically a large-capacity data storage 421 with a transmission unit 422 arranged to couple it to the trunk lines of the GPRS network (or a corresponding packet data network) as well as a control unit 423 to control the setting up, maintaining and tearing down of connections. The control block 423 may be made to recognize specific service type identifiers from an Activate PDP Context Request message by programming the corresponding operations into a memory in the form of machine-readable processing instructions. The data storage 421 may be used to store the specific service type identifers in association with e.g. charging information.

The GGSN is a data processing device comprising also a data storage 431 with a transmission unit 432 arranged to couple it to the trunk lines of the GPRS network (or a corresponding packet data network) as well as a control unit 433 to control the setting up, maintaining and tearing down of connections. The control block 433 may be made to recognize specific service type identifiers from a Create PDP Context Request message by programming the corresponding operations into a memory in the form of machine-readable processing instructions. The data storage 431 may be used to store the specific service type identifers in association with e.g. charging information.

The invention has been described above exclusively with reference to GPRS and UMTS terminology. However, the invention is equally applicable to all such systems where the activation request message for a new packet-switched communication connection comprises a type field for which a limited set of main values have been defined. The invention has also been described only with references to Activate PDP Context Request/Create PDP Context Request messages that are transmitted as the indication of the need for a completely new PDP Context; however a similar message may be transmitted when one of the communicating parties has found that the characteristics of the existing PDP Context are not optimal for the current use of the PDP Context, so that the "activate" message actually means that the characteristics of an existing PDP Context must be redefined.

The invention claimed is:

1. A method for indicating the specific use of a packet-switched communication connection between a mobile station and a fixed packet-switched data transmission network, where the activation of a new packet-switched communication connection involves the step of transmitting an activation request message with a service type indicator field for which a set of service type indicator values have been defined, at least one of the service type indicators defining a category, the method comprising the step of:
transmitting within the activation request message an indicator value indicating the specific use, a subtype that falls within a category defined by a service type indicator value, of the packet-switched communication connection the activation of which is requested with the activation request message.

2. A method according to claim 1, comprising the step of:
transmitting within the service type indicator field an indicator that partly consists of a service type indicator value and partly consists of a second indicator value indicating the specific use of the packet-switched communication connection the activation of which is requested with the activation request message.

3. A method according to claim 2, wherein the activation request message is an Activate Packet Data Protocol ("PDP") Context Request message and the service type indicator field is a PDP Type field.

4. A method according to claim 2, wherein the activation request message is a Create PDP Context Request message and the service type indicator field is a PDP Type field.

5. A method according to claim 2, wherein the activation request message is a PDU Notification Request message and the service type indicator field is a PDP Type field.

6. A method according to claim 2, wherein the activation request message is a Request PDP Context Activation order and the service type indicator field is a PDP Type field.

7. A method according to claim 1, comprising the step of:
transmitting within the activation request message a configuration options field and within said configuration options field said indicator value indicating the specific use, in more detail than the service type indicator values, of the packet-switched communication connection the activation of which is requested with the activation request message.

8. A method according to claim 1, additionally comprising the step of:
storing a second indicator value indicating the specific use of the packet-switched communication connection in association with a set of information used to charge a subscriber of the fixed packet-switched data transmission network for the use of services provided through the fixed packet-switched data transmission network.

9. A method according to claim 8, wherein said step of storing said second indicator value in association with a set of information used to charge a subscriber is accomplished in a Gateway General Packet Radio Service ("GPRS") Supporting Node of a GPRS network.

10. A method according to claim 8, wherein said step of storing said second indicator value in association with a set of information used to charge a subscriber is accomplished in a Serving GPRS Supporting Node of a GPRS network.

11. An arrangement for providing packet-switched communication connections between a mobile station and a fixed packet-switched data transmission network and for indicating the specific use of a packet-switched communication connection, comprising means for transmitting an activation request message as an indicator for the need of activating a new packet-switched communication connection for which a set of service type indicator values have been defined, at least one of the service type indicator values defining a category, the arrangement comprising:
means for transmitting, within the activation request message, an indicator value indicating the specific use, as a subtype that falls within a category defined by a service type indicator value, of the packet-switched communication connection the activation of which is requested with the activation request message.

12. An arrangement according to claim 11, comprising means for transmitting, within a service type indicator field of the activation request message, an indicator that partly consists of a service type indicator value and partly consists of a second indicator value indicating the specific use of the packet-switched communication connection the activation of which is requested with the activation request message.

13. An arrangement according to claim 11, comprising means for transmitting, within the activation request message a configuration options field and within said configuration options field said indicator value indicating the specific use, in more detail than the service type indicator values, of the packet-switched communication connection the activation of which is requested with the activation request message.

14. An arrangement according to claim 11, comprising a Serving General Packet Radio Service ("GPRS") Support Node and a Gateway General Packet Radio Service ("GPRS") Support Node and in at least one of them means for storing said second indicator value indicating the specific use of the packet-switched communication connection in association with a set of information used to charge a subscriber of the fixed packet-switched data transmission network for the use of services provided through the fixed packet-switched data transmission network.

15. A method of indicating a use of a packet-switched communication between a mobile station and a fixed packet switched data transmission network comprising:

- transmitting an activation request message from the mobile station, the activation request messaging comprising a service type indicator field for which a set of service type indicator values are defined, at least on of the service type indicator values defining a category;
- transmitting, within the activation request message, an indicator value field indicating a specific use, as a subtype that falls within a category defined by a service type indicator value, of the packet switched communication connection between the mobile station and the fixed packet switched data transmission network.

\* \* \* \* \*